(12) United States Patent
Keller et al.

(10) Patent No.: US 8,069,616 B2
(45) Date of Patent: Dec. 6, 2011

(54) METHOD FOR MOUNTING A MOTOR VEHICLE DOOR LOCK

(75) Inventors: Peter Oliver Keller, Clarston, MI (US); Warren Huisman, Clarkston, MI (US)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 746 days.

(21) Appl. No.: 11/851,553

(22) Filed: Sep. 7, 2007

(65) Prior Publication Data

US 2009/0064591 A1 Mar. 12, 2009

(51) Int. Cl.
*E06B 3/00* (2006.01)
(52) U.S. Cl. .............................. 49/506; 49/503
(58) Field of Classification Search ............. 49/503, 49/506; 292/216, 201, 336.3, DIG. 65, DIG. 53
See application file for complete search history.

(56) References Cited

U.S. PATENT DOCUMENTS

| | | | | |
|---|---|---|---|---|
| 3,541,874 A * | 11/1970 | Durocher | ................. | 74/89.23 |
| 4,093,289 A * | 6/1978 | Inabayashi et al. | ........ | 292/336.3 |
| 4,290,634 A * | 9/1981 | Gelhard | ...................... | 292/201 |
| 4,315,649 A * | 2/1982 | Lutz | .............................. | 292/201 |
| 4,364,249 A * | 12/1982 | Kleefeldt | ........................ | 70/264 |
| 4,487,441 A * | 12/1984 | Miyamoto et al. | ........ | 292/336.3 |
| 4,492,395 A * | 1/1985 | Yamada | ......................... | 292/216 |
| 4,505,500 A * | 3/1985 | Utsumi et al. | .................. | 292/48 |
| 4,536,021 A * | 8/1985 | Mochida | ...................... | 292/201 |
| 4,566,350 A * | 1/1986 | Miyamoto et al. | ............. | 74/526 |
| 4,573,723 A * | 3/1986 | Morita et al. | ............ | 292/336.3 |
| 4,575,138 A * | 3/1986 | Nakamura et al. | ........... | 292/216 |
| 4,674,781 A * | 6/1987 | Reece et al. | ................ | 292/336.3 |
| 4,793,640 A * | 12/1988 | Stewart, Sr. | .................... | 292/201 |
| 4,827,671 A * | 5/1989 | Herringshaw et al. | ......... | 49/503 |
| 4,861,081 A * | 8/1989 | Satoh | ......................... | 292/336.3 |
| 4,885,954 A * | 12/1989 | Wanlass | ...................... | 356/73.1 |
| 4,986,098 A * | 1/1991 | Fisher | ............................. | 70/262 |
| 4,995,654 A * | 2/1991 | Nishigami et al. | ........... | 292/216 |
| 5,234,237 A * | 8/1993 | Gergoe et al. | ................ | 292/201 |
| 5,605,363 A * | 2/1997 | Kapes | ........................... | 292/196 |
| 5,634,676 A * | 6/1997 | Feder | ........................... | 292/201 |
| 5,715,713 A * | 2/1998 | Aubry et al. | .................... | 70/277 |
| 5,752,346 A * | 5/1998 | Kritzler et al. | ................. | 49/503 |
| 5,769,471 A * | 6/1998 | Suzuki et al. | ............. | 292/336.3 |
| 5,845,947 A * | 12/1998 | Arabia et al. | ..................... | 292/1 |
| 5,855,096 A * | 1/1999 | Staser et al. | ..................... | 49/503 |
| 6,079,757 A * | 6/2000 | Aubry | .......................... | 292/201 |

(Continued)

FOREIGN PATENT DOCUMENTS

DE  25 22 301 C3  12/1976

*Primary Examiner* — Jerry Redman
(74) *Attorney, Agent, or Firm* — Roberts Mlotkowski Safran & Cole, P.C.; David S. Safran

(57) ABSTRACT

A motor vehicle door and to a motor vehicle door lock and a method for mounting the motor vehicle door lock in a motor vehicle door, the motor vehicle door lock having an inside locking lever, and when installed, being located in a hollow space of the door and coupled to an inside safety element via a connecting rod that extends through a passage opening in an inside wall segment of the door body. To facilitate installation, the connecting rod is formed of two segments, a lower connecting rod segment extending through the passage opening and being connected to a an upper connecting rod segment at a location that is outside of the hollow space in proximity to the passage opening.

4 Claims, 7 Drawing Sheets

U.S. PATENT DOCUMENTS

| | | | |
|---|---|---|---|
| 6,131,965 A * | 10/2000 | Trammell, Jr. | 292/1 |
| 6,393,767 B1 * | 5/2002 | Fukumoto et al. | 49/503 |
| 6,457,753 B1 * | 10/2002 | Wegge | 292/216 |
| 6,729,663 B2 * | 5/2004 | Fisher | 292/201 |
| 6,848,737 B2 * | 2/2005 | Mikolai et al. | 296/146.9 |
| 7,070,214 B2 * | 7/2006 | Fisher et al. | 292/216 |
| 7,192,076 B2 * | 3/2007 | Ottino | 296/146.1 |
| 2001/0022051 A1 * | 9/2001 | Fukumoto et al. | 49/503 |
| 2002/0005015 A1 * | 1/2002 | Spurr | 49/502 |
| 2003/0030289 A1 * | 2/2003 | Fisher et al. | 292/336.3 |
| 2003/0177974 A1 * | 9/2003 | Dominique | 116/200 |
| 2008/0143124 A1 * | 6/2008 | Watson et al. | 292/336.3 |
| 2008/0276541 A1 * | 11/2008 | Roy et al. | 49/502 |

* cited by examiner

METHOD FOR MOUNTING A MOTOR VEHICLE DOOR LOCK

BACKGROUND OF THE INVENTION

1. Field of the Invention

This invention relates, generally, to a method for mounting a motor vehicle door lock to a motor vehicle door. The motor vehicle door lock comprises an inside locking lever that, in the mounting condition, is coupled to an inside safety element via a connecting rod. Also, this invention relates generally to a motor vehicle door and to a motor vehicle door lock.

2. Description of Related Art

Known motor vehicle doors comprise a door body providing a hollow space, in which the motor vehicle door lock is situated. Such an arrangement is shown in German Patent DE 25 22 301 C3. The motor vehicle door lock disclosed in this patent comprises an inside locking lever that, in the mounted condition, is coupled to an inside safety element via a connecting rod. The inside safety element may be actuated by a passenger who is sitting inside the motor vehicle in order to lock or unlock the door lock. The door body has a wall segment which bounds the hollow space from the passenger compartment and which has a passage opening through which in the mounted condition the connecting rod extends.

Mounting of the known motor vehicle door lock always leads to problems. If the motor vehicle door lock is to be mounted while the connecting rod is already coupled to the inside locking lever, it normally takes a considerable amount of skill and practice to find the respective passage opening in the wall segment of the door body due to the large extension of the connecting rod. If the connecting rod is to be coupled to the motor vehicle door lock after the lock has been mounted, finding the inside locking lever is generally even harder.

Another drawback of the known arrangement is the fact that, normally, the part of the connecting rod that, in the mounted condition, is located outside the hollow space is normally of considerable length. In many cases this leads to the necessity of a large mounting opening within the door body as the lock has to be moved over an accordingly large distance in mostly vertical direction.

SUMMARY OF THE INVENTION

A primary object of the present invention is directed to providing a method for mounting a motor vehicle door lock to a motor vehicle door that speeds up the mounting process, and at the same time, reduces the skill and practice necessary for mounting of the motor vehicle door lock.

It is essential for the teaching of the present invention that the connecting rod between the inside locking lever and the inside safety element is at least a two part component comprising an upper connecting rod and a lower connecting rod. After coupling of the lower connecting rod to the inside locking lever, the motor vehicle door lock is moved into the hollow space, thereby guiding the lower connecting rod through the passage opening. This can easily be done due to the reduced length of the lower connecting rod. Next, the connecting rod is completed by coupling the upper connecting rod to the lower connecting rod at a coupling position, which is outside the hollow space in proximity of the passage opening.

In accordance with another exemplary embodiment of the invention, the coupling of the upper connecting rod to the lower connecting rod comprises the steps of moving the upper connecting rod into a pre-mounted engagement position and locking the coupling by pivoting the upper connecting rod from the pre-mounted engagement position into the mounted position around a pivot axis that is oriented perpendicular to the overall extension of the connecting rod in its mounted condition. This way of locking said coupling guarantees a safe connection between the upper connecting rod and the lower connecting rod as pivoting the upper connecting rod back cannot take place during normal operation of the motor vehicle due to the coupling of the safety element to an inner door panel or the like.

According to another teaching, the above object is achieved by a motor vehicle door and a motor vehicle door lock as described above.

The invention is explained in detail below with reference to the accompanying drawings.

DETAILED DESCRIPTION OF THE INVENTION

Figure 4:
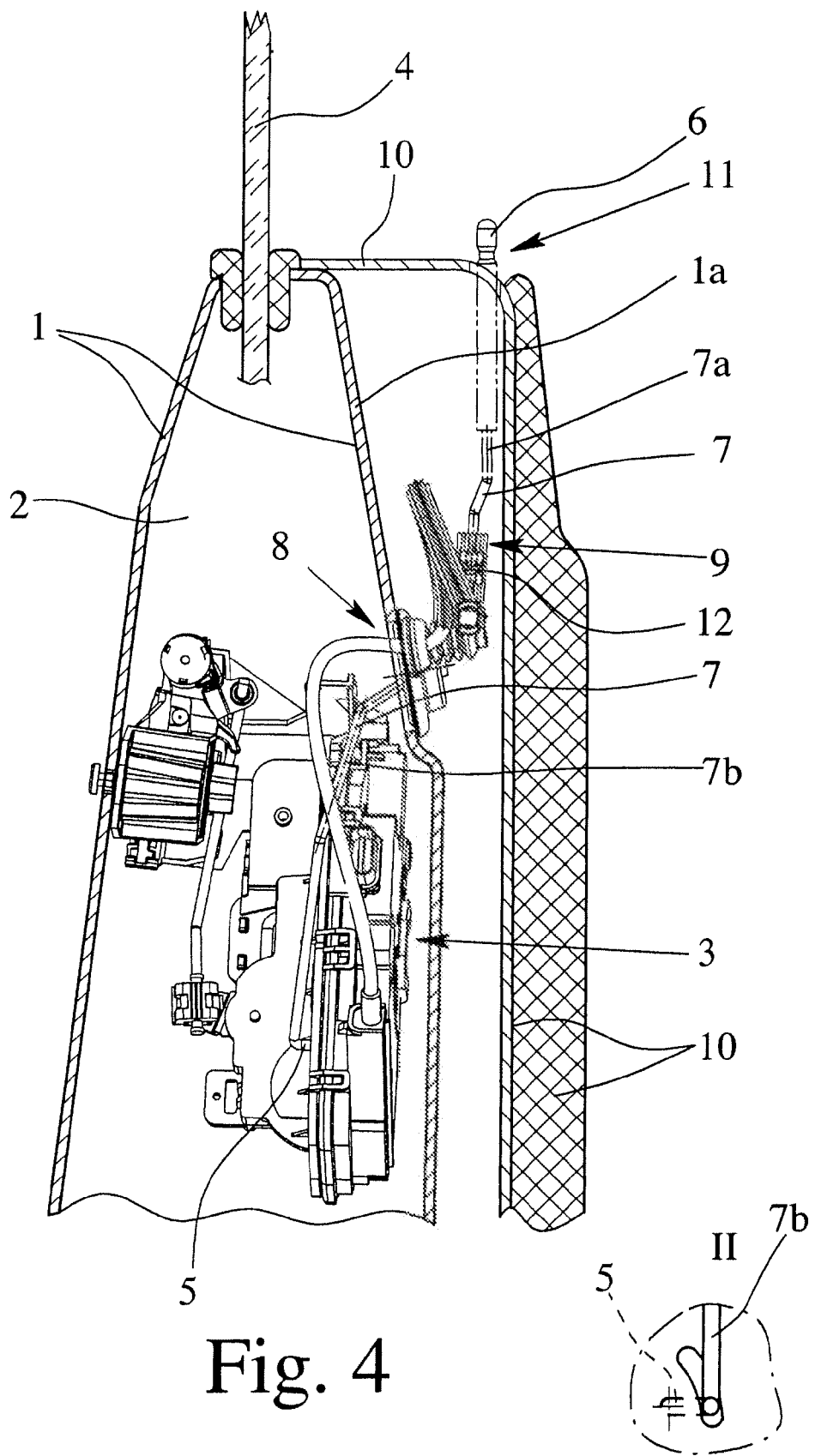
FIG. 4 is a sectional view taken along line II-II of FIG. 1 showing the motor vehicle door lock after a fourth step of the mounting process according to the invention.

The motor vehicle door shown in FIG. 4 comprises a door body 1 enclosing a hollow space 2 in which a motor vehicle door lock 3 is situated in its fully mounted condition. A window 4 is shown that may be moved further into the hollow space 2 by a respective mechanism. The window 4, however, is not relevant for the present invention.

The motor vehicle door lock 3 comprises an inside locking lever 5 that is part of the lock mechanism. The inside locking lever 5 is coupled to an inside safety element 6 via a connecting rod 7. The inside safety element 6 is located in such a way that it is actuatable by a passenger sitting inside the motor vehicle. By this activation, the motor vehicle door lock 3 may be switched into the locked and into the unlocked state.

The door body 1 has a wall segment 1a which separates the hollow space 2 from the passenger compartment. It is to be understood that this expression presently has a broad meaning. For example additional panel elements can be provided on the wall segment 1a as will be described. The wall segment 1a has a passage opening 8 through which the connecting rod 7 extends.

The connecting rod 7 is at least a two part component comprising an upper connecting rod 7a and a lower connecting rod 7b. In a preferred embodiment, the connecting rod 7 comprises only those two components, namely the upper connecting rod 7a and the lower connecting rod 7b. The upper connecting rod 7a and the lower connecting rod 7b are coupled to each other at a coupling position 9, which coupling position 9 is outside of the hollow space 2 in proximity to the passage opening 8.

It can also be seen from FIG. 4 that the coupling position 9 is not located at an end of the connecting rod 7, but rather in the area of the midsection of the connecting rod 7, which leads to the above noted advantage related to creation of a comparably short lower connecting rod 7*b*.

The above construction of the connecting rod 7 as an at least two part component is mainly advantageous in view of the mounting process of the motor vehicle door lock.

Another advantage of the at least two part construction of the connecting rod 7, however, is the fact that, in the case of a crash, the coupling between the upper connecting rod 7*a* and the lower connecting rod 7*b* has a pre-determined breaking point. With this, the crash characteristics of the motor vehicle door, in view of the breakage of the connecting rod 7, is well controllable.

The preferred embodiment shown in FIG. 4 comprises an inside door panel 10 which is mounted on the door body 1 facing the passenger compartment. The inside safety element 6 is situated at the inside door panel 10. Preferably, the inside safety element 6 is situated inside the door panel 10 and, moreover, extends through the inside door panel 10. However, it is also possible that the inside safety element 6 is situated beside the inside door panel 10.

Preferably, the inside door panel 10 comprises a passage opening 11 for the inside safety element 6, wherein the passage opening 11 in the inside panel 10 is spaced from the passage opening 8 in said wall segment 1*a* of the door body 1. As can be seen in FIG. 4, the spacing between the passage opening 11 in the door panel 10 and the passage opening 8 in the wall segment 1*a* extends mainly in a vertical direction.

In all preferred embodiments shown in the drawings, a coupling element 12 is provided for coupling the upper connecting rod 7*a* and the lower connecting rod 7*b*. It is especially advantageous for the mounting process if the coupling element 12 is realized as a snap-on connection. Two examples of such a snap-on connection are shown in FIG. 5 and in FIGS. 6 & 7.

In order to ensure a reliable transmission of actuation force via the connecting rod 7, it is preferred that at least the free end 7*a*', 7*b*' of at least one of the upper connecting rod 7*a* and the lower connecting rod 7*b* has a 90° bent end portion and that the coupling element 12 has one opening 13 or two openings 13, 14 for reception of the one end portion or the two end portions.

Figure 3:
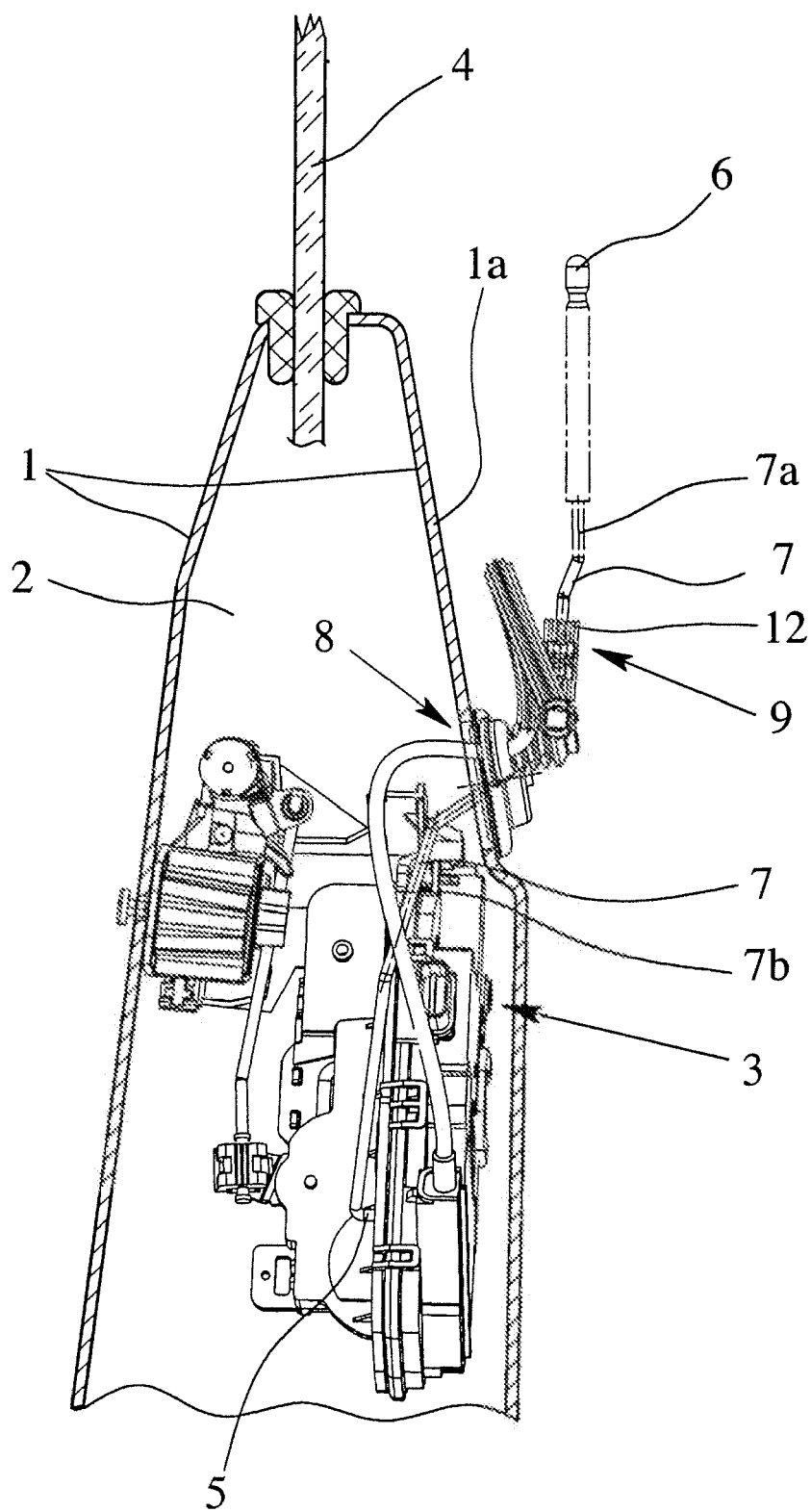
FIG. 3 is a sectional view taken along line II-II of FIG. 1 showing the motor vehicle door lock after a third step of the mounting process according to the invention.
Figure 5:
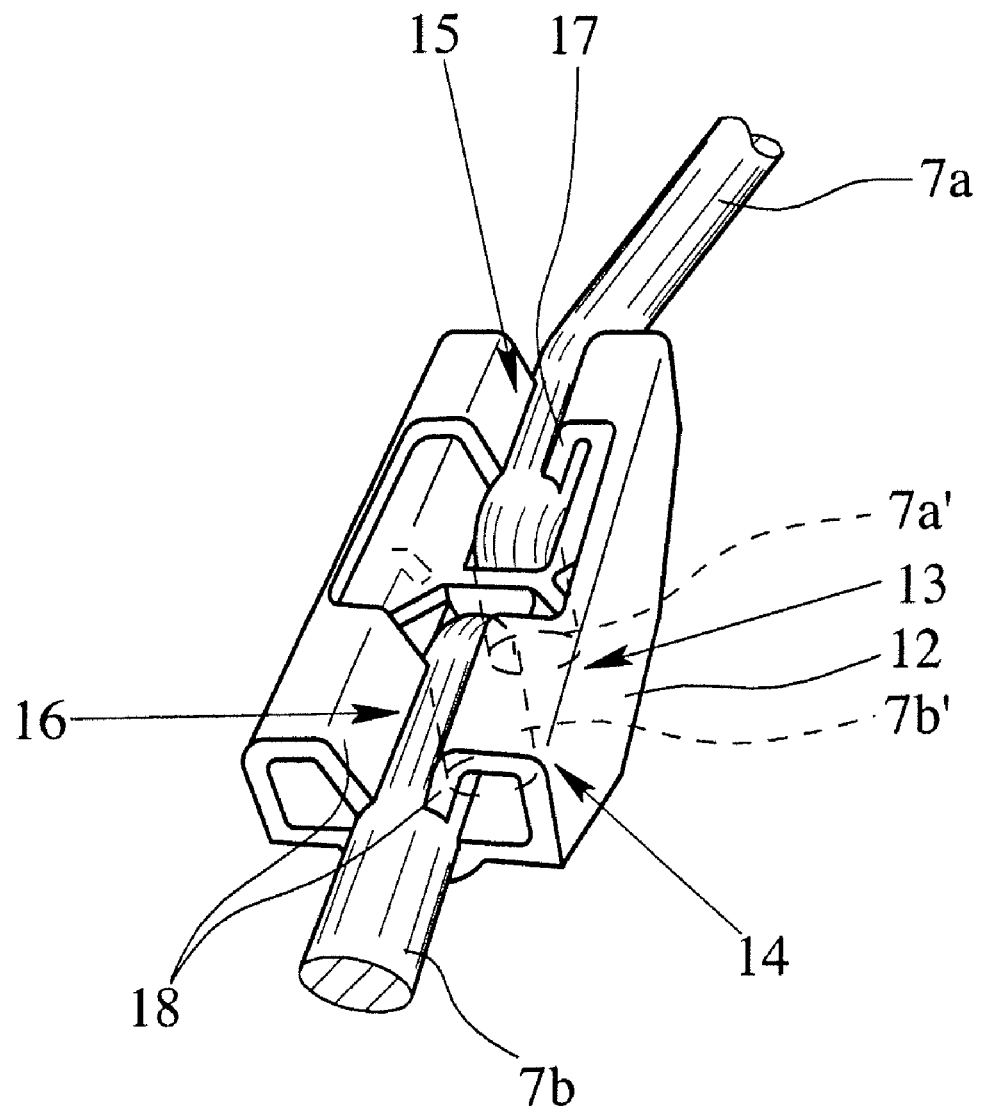
FIG. 5 is a schematic perspective view of a coupling element for coupling of the upper connecting rod and the lower connecting rod.

According to a preferred embodiment shown in FIG. 5, which may be applied to the arrangement shown in FIG. 3, the free ends 7*a*', 7*b*' of both the upper connecting rod 7*a* and the lower connecting rod 7*b* have respective 90° bent end portions. The coupling element 12 has two channel-like receivers 15, 16 for the two free ends 7*a*', 7*b*'. The side walls 17, 18 of the receivers 15, 16 are bendable such that they form a spring element for the respective free end 7*a*', 7*b*'.

For coupling the upper connecting rod 7*a* to the lower connecting rod 7*b* both free ends 7*a*', 7*b*' are guided through the openings 13, 14 in the coupling element 12 and pushed into the channel like receivers 15, 16 until the spring like sidewalls 17, 18 snap into their respective locking position. This locking position is shown in FIG. 5.

During the mounting process, it may be advantageous that the coupling element 12 is already fixed to one of the upper connecting rod 7*a* and the lower connecting rod 7*b*.

Figure 6:
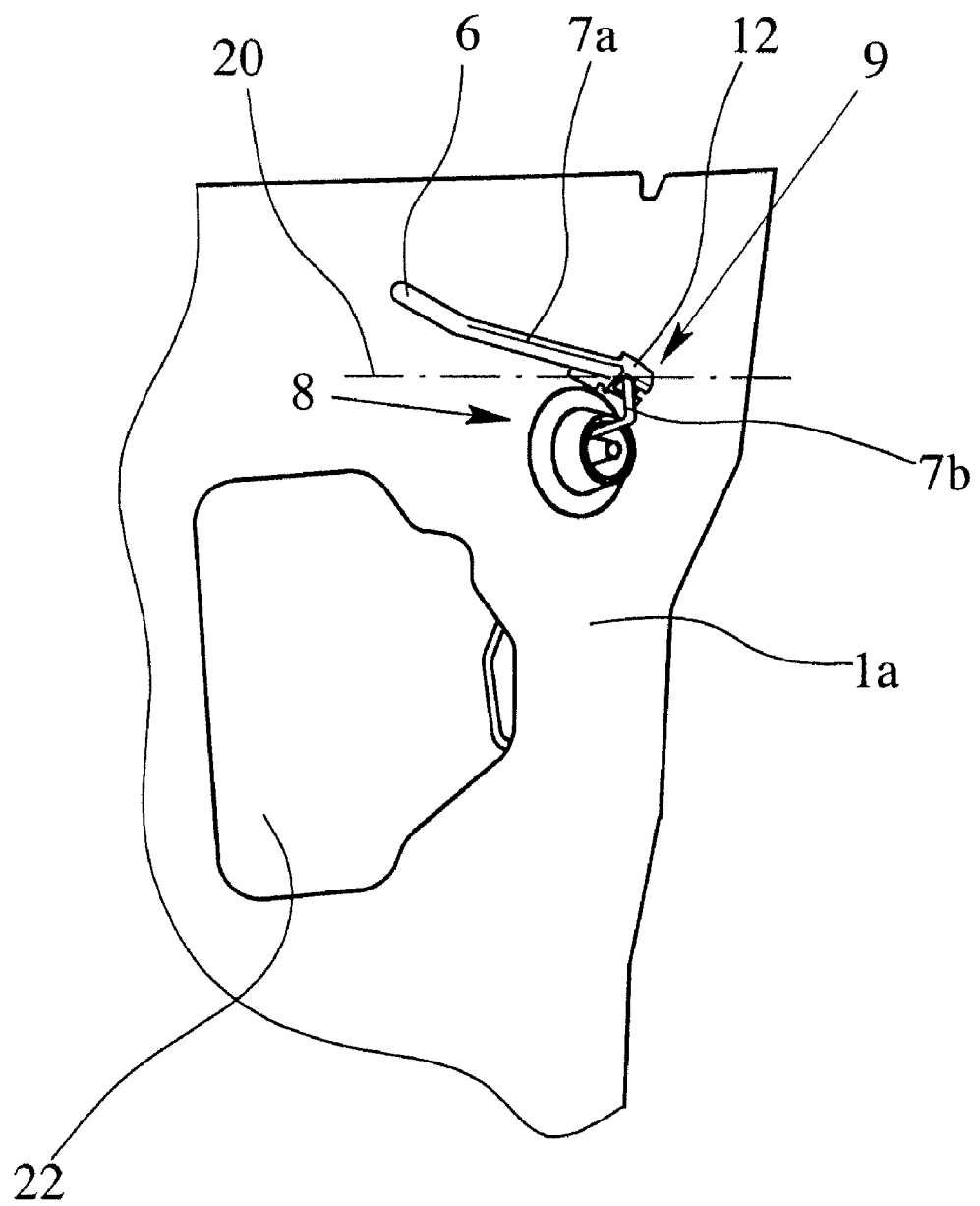
FIG. 6 is a schematic diagram showing another embodiment of the coupling element before locking.
Figure 7:
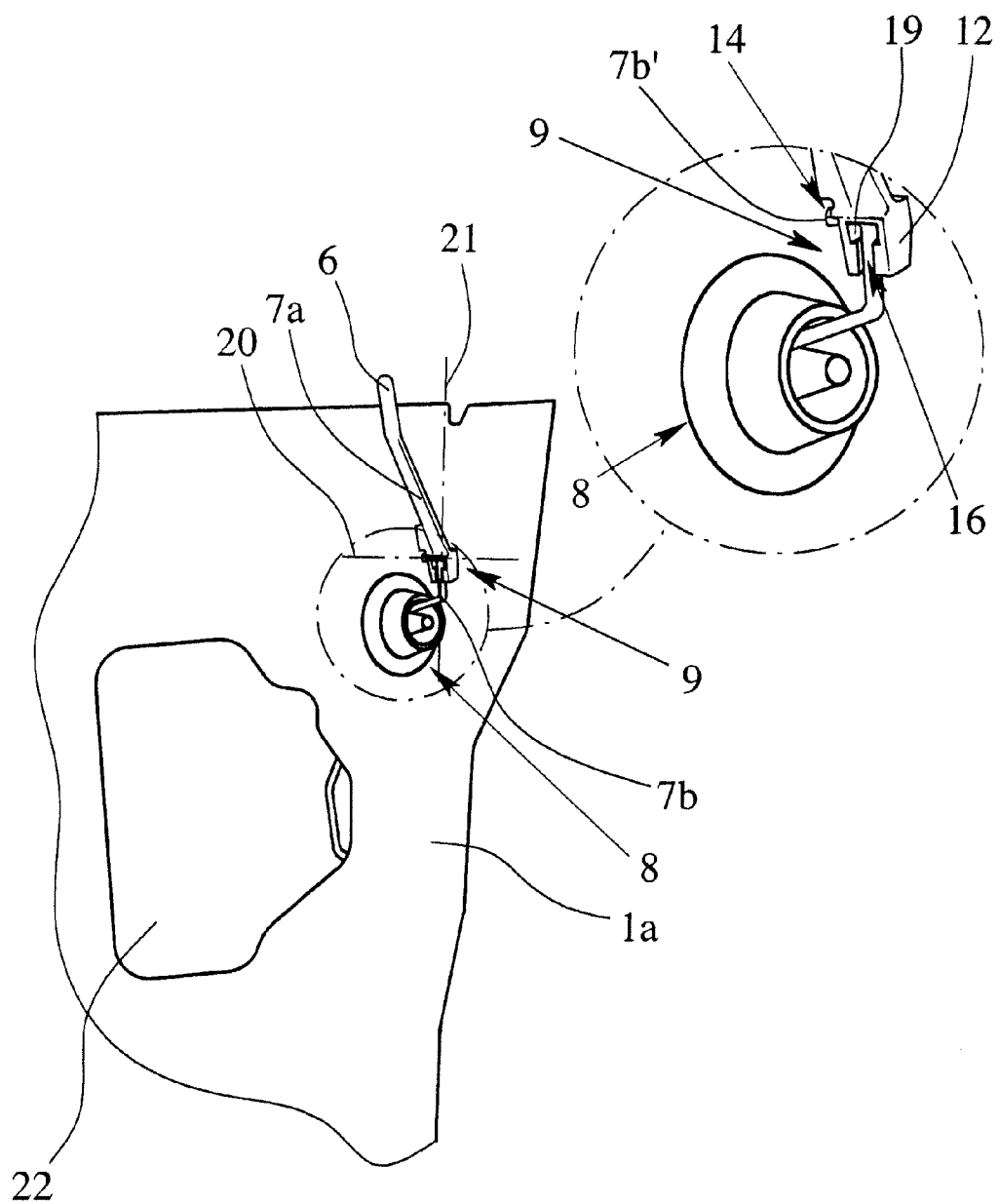
FIG. 7 is a schematic diagram of another embodiment of the coupling element after locking with a dot-dash detail thereof shown in enlarged detail.

Another preferred embodiment of the coupling element 12 is shown in FIGS. 6 & 7. In this case, the coupling element 12 is formed as part of the upper connecting rod 7*a* and even with the inside safety element 6.

The coupling element 12 comprises an opening 14 for reception of the free end 7*b*' of the lower connecting rod 7*b*, which has a 90° bent portion as described above. Further the coupling element 12 comprises a channel like reception 16 for the free end 7W. The fully coupled state is shown in FIG. 7.

For the coupling process the coupling element 12 comprises an insertion hole 19 through which the bent end portion of the free end 7*b*' is to be inserted and then guided through into the opening 14. This pre-mounted engagement position is shown in FIG. 6.

The coupling may be locked by pivoting the upper connecting rod 7*a* from the pre-mounted position (FIG. 6) into the mounted position (FIG. 7) around a pivot axis 20 that is oriented mainly perpendicular to the overall extension 21 of the connecting rod 7 in its mounted condition. The pivot range of the upper connecting rod 7*a* is about 90° as shown in FIGS. 6 & 7.

The upper connecting rod 7*a* and the inside safety element 6 are preferably a one piece component, as is shown in FIG. 6. This leads to a reduction of the number of components and accordingly to a reduction of costs. The same is to be said when the upper connecting rod 7*a* and the coupling element 12 are a one piece component, as also shown in FIG. 6. A maximum decrease in costs may be achieved when the upper connecting rod 7*a*, the inside safety element 6 and the coupling element 12 are altogether a one piece component. Again, this is shown in FIG. 6.

The method for mounting the motor vehicle door lock 3 to the motor vehicle door shown in the drawings will be now be described in detail.

The method applies to a motor vehicle door as described above comprising a door body 1 providing a hollow space 2. Accordingly, the motor vehicle door lock 3 comprises an inside locking lever 5 that in the mounted condition is coupled to an inside safety element 6 via a connecting rod 7. The door body 1 has a wall segment 1*a* which bounds the hollow space 2 from the passenger compartment and which has a passage opening 8 through which in the mounted condition the connecting rod 7 extends. Here, the connecting rod 7 is a two part component and may also be a multiple part component that comprises at least an upper connecting rod 7*a* and a lower connecting rod 7*b*.

Figure 1:
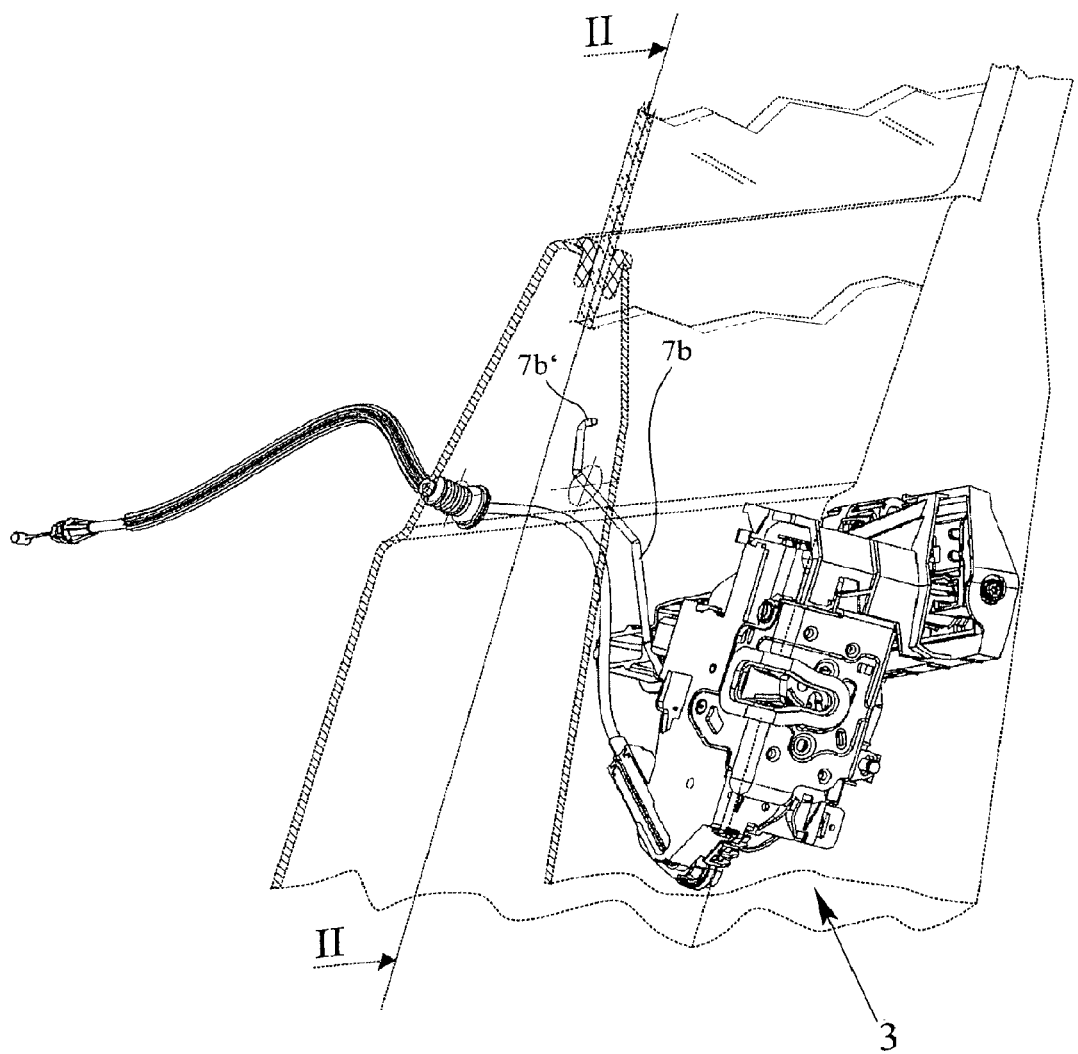
FIG. 1 is a perspective view of a section of a motor vehicle door with a door lock after a first step of the mounting method according to the invention.
Figure 2:
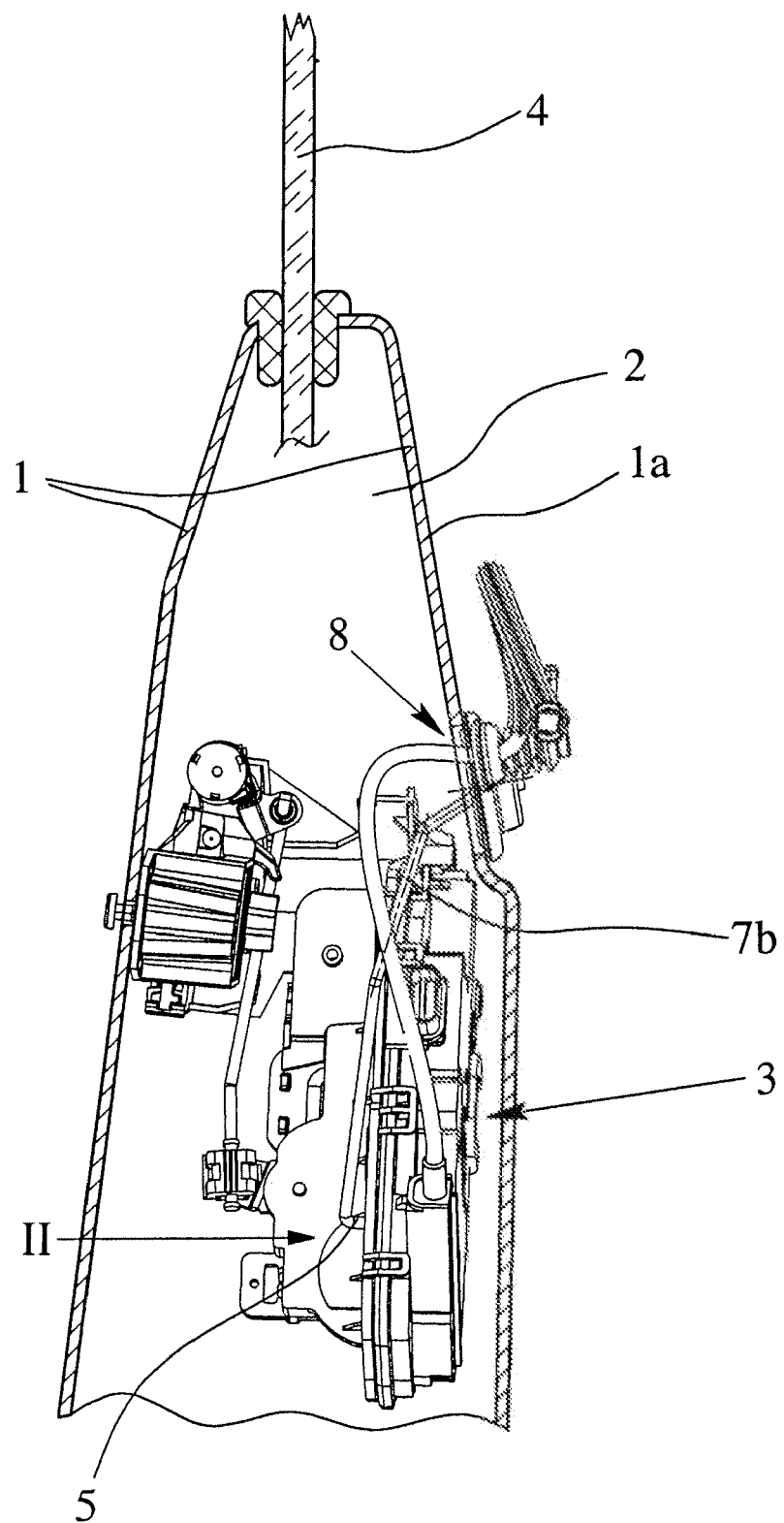
FIG. 2 is a sectional view taken along line II-II of FIG. 1 showing the motor vehicle door lock after a second step of the mounting process according to the invention.

First of all, according to the method of the invention, it is proposed to couple the lower connecting rod 7*b* to the inside locking lever 5. This is shown in FIG. 1. In a second mounting step, the motor vehicle door lock 3, together with the lower connecting rod 7*b* is moved into the hollow space 2 while guiding the lower connecting rod 7*b* through the passage opening 8. For this second mounting step, a mounting opening 22 is located in the wall segment 1*a*. This is shown by example in FIGS. 6 & 7. Due to the fact that the lower connecting rod 7*b* has a short dimension, this mounting step, including guiding the lower connecting rod 7*b* through the passage opening 8, is very easy to perform. The completion of the second mounting step is shown in FIG. 2.

In a third mounting step, the upper connecting rod 7*a* is coupled to the lower connecting rod 7*b* at the coupling position 9, which coupling position 9 is outside the hollow space 2 in proximity of the passage opening 8. Due to the fact that the coupling position 9 is outside the hollow space 2, the coupling of the upper connecting rod 7*a* to the lower connecting rod 7*b* is possible without any effort at all. The completion of the third mounting step is shown in FIG. 3.

According to the construction of the motor vehicle door it may in a fourth step be necessary to mount an inside door panel 10 onto the door body 1 facing the passenger compartment, thereby guiding one of the inside safety element 6 and the upper connecting rod 7a through a passage opening 11 in the inside door panel 10. The completion of the fourth mounting step is shown in FIG. 4.

When using the preferred embodiment of the coupling element 12 shown in FIG. 5, the coupling between the upper connecting rod 7a and the lower connecting rod 7b requires a linear movement between the free ends 7a', 7b' of the upper connecting rod 7a and the lower connecting rod 7b relative to the coupling element 12.

According to the embodiment shown in FIGS. 6 & 7, however, the above coupling includes a pivoting movement of the upper connecting rod 7a.

First of all, the upper connecting rod 7a is moved into the above noted pre-mounted engagement position shown in FIG. 6 with the bent end portion of the free end 7b' already positioned in the opening 14 of the coupling element 12. The coupling is then locked by pivoting the upper connecting rod 7a from the pre-mounted engagement position into the mounted position around a pivot axis 20 that is oriented mainly perpendicular to the overall extension 21 of the connecting rod 7 in its mounted condition. While pivoting the upper connecting rod 7a, as described above, the straight part of the free end 7b' enters the channel-like reception 16 of the coupling element 12.

The only way to unlock the coupling is by pivoting the upper connecting rod 7a in the opposite direction, in FIG. 7 counterclockwise. After the inside door panel 10 has been mounted (FIG. 4), however, this unlocking is no longer possible. This leads to high safety regarding unwanted decoupling of the upper connecting rod 7a and the lower connecting rod 7b.

With regard to applying the above method to the preferred embodiment of FIGS. 6 & 7, it is noted that the pivot range of the upper connecting rod 7a for locking said coupling is preferably about 90°.

What is claimed is:

1. Method for mounting a motor vehicle door lock to a motor vehicle door, the motor vehicle door comprising a door body providing a hollow space, the motor vehicle door lock comprising a lock mechanism with an inside locking lever that is coupled to an inside safety element via a connecting rod in a mounted position, the inside safety element being located so as to be actuatable by a passenger sitting inside a motor vehicle to which the motor vehicle door forms a part in order to switch the motor vehicle door lock into a locked and an unlocked state, the door body having a wall segment which bounds the hollow space relative to a vehicle passenger compartment and which has a passage opening through which in the mounted condition the connecting rod extends, wherein the connecting rod that couples the inside locking lever and the inside safety element is at least a two part component comprising an upper connecting rod and a lower connecting rod, the method comprising the steps of:

coupling the lower connecting rod to the inside locking lever of the lock mechanism, installing the motor vehicle door lock inside the hollow space of the door body by moving the motor vehicle door lock together with the lower connecting rod into the hollow space, and guiding the lower connecting rod through the passage opening, then, coupling the upper connecting rod to the lower connecting rod at a coupling position located outside of the hollow space in proximity to the passage opening while the motor vehicle door lock remains installed inside of the hollow space of the door body.

2. Method according to claim 1, wherein, after said coupling of the upper connecting rod to the lower connecting rod, an inside door panel is mounted onto the door body facing the passenger compartment, with one of the inside safety element and the upper connecting rod being guided through a passage opening in the inside door panel.

3. Method according to claim 1, wherein said step of coupling the upper connecting rod to the lower connecting rod comprises the steps of moving the upper connecting rod into a pre-mounted engagement position and locking the coupling by pivoting the upper connecting rod from the pre-mounted engagement position into a mounted position around a pivot axis that is oriented perpendicular to an overall extension of the connecting rod.

4. Method according to claim 3, wherein the upper connecting rod has a pivot range for locking said coupling that is about 90°.

* * * * *